(12) United States Patent
Jain et al.

(10) Patent No.: US 9,009,392 B2
(45) Date of Patent: Apr. 14, 2015

(54) LEVERAGING A HYBRID INFRASTRUCTURE FOR DYNAMIC MEMORY ALLOCATION AND PERSISTENT FILE STORAGE

(75) Inventors: Bhushan P. Jain, Jalgaon (IN); Sandeep R. Patil, Pune (IN); Sri Ramanathan, Lutz, FL (US); Gandhi Sivakumar, Victoria (AU); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 13/455,625

(22) Filed: Apr. 25, 2012

(65) Prior Publication Data

US 2013/0290599 A1 Oct. 31, 2013

(51) Int. Cl.
 G06F 12/00 (2006.01)
 G06F 12/08 (2006.01)
(52) U.S. Cl.
 CPC ................... *G06F 12/0871* (2013.01)
(58) Field of Classification Search
 USPC ........................................................ 711/103
 See application file for complete search history.

(56) References Cited

U.S. PATENT DOCUMENTS

| 5,491,808 | A | * | 2/1996 | Geist, Jr. ........................ 711/100 |
| 7,149,865 | B2 | | 12/2006 | Chamberlain et al. |
| 7,212,306 | B2 | | 5/2007 | Chrisop et |
| 7,949,637 | B1 | | 5/2011 | Burke |
| 2005/0172067 | A1 | * | 8/2005 | Sinclair .......................... 711/103 |
| 2007/0022241 | A1 | * | 1/2007 | Sinclair .......................... 711/100 |
| 2007/0156997 | A1 | | 7/2007 | Boule et al. |
| 2009/0172270 | A1 | | 7/2009 | Kardach et al. |
| 2010/0070733 | A1 | | 3/2010 | Ng et al. |
| 2010/0211743 | A1 | * | 8/2010 | Hara .............................. 711/119 |
| 2011/0161557 | A1 | | 6/2011 | Haines et al. |
| 2011/0179219 | A1 | * | 7/2011 | Ma et al. ........................ 711/103 |
| 2011/0238887 | A1 | * | 9/2011 | Bazzani ........................ 711/103 |

FOREIGN PATENT DOCUMENTS

| EP | 2221830 A1 | 8/2010 |
| WO | 02065275 A1 | 8/2002 |

OTHER PUBLICATIONS

P. R. Panda et al., "Data and Memory OptimizationTechniques for Embedded Systems", ACM Transactions on Design Automation of Electronic Systems, vol. 6, No. 2, Apr. 2001, pp. 149-206.
Anonymously, "Method and System for Managing Hybrid Caches", Apr. 2, 2010, Downloaded from http://ip.com/IPCOM/000194598, Disclosure No. IPCOM000194598D, 1 page.

* cited by examiner

*Primary Examiner* — Aimee Li
*Assistant Examiner* — Prasith Thammavong
(74) *Attorney, Agent, or Firm* — Matthew Chung; Roberts Mlotkowski Safran & Cole, P.C.

(57) ABSTRACT

Dynamic allocation of memory in a hybrid system is provided. In particular, a method and system is provided to leverage a hybrid infrastructure for dynamic memory allocation and persistent file storage. The method includes dynamically allocating a file or its part or to cache a file or its part between different storage technologies and respective memory technologies in a hybrid infrastructure.

24 Claims, 4 Drawing Sheets

|  | SRAM | eDRAM | PRAM | MRAM |
|---|---|---|---|---|
| Density | Low | High | Very High | High |
| Speed (read) | Very Fast | Fast | Slow | Fast |
| Speed (write) | Very Fast | Fast | Very Slow | Slow |
| Dynamic Power (read) | Low | Medium | Medium | Low |
| Dynamic Power (write) | Low | Medium | High | Very High |
| Leakage Power | High | Medium | Low | Low |

FIG. 1

LEVERAGING A HYBRID INFRASTRUCTURE FOR DYNAMIC MEMORY ALLOCATION AND PERSISTENT FILE STORAGE

TECHNICAL FIELD

The present invention generally relates to dynamic allocation of memory in a hybrid system, and more particularly, to a method and system to leverage a hybrid infrastructure for dynamic memory allocation and persistent file storage.

BACKGROUND

Over the years, there have been significant advances in disk technology and Random Access Memory (RAM) technology. For example, these technologies include Phase change Memory, sRAM, Magnetoresistive Random Access Memory (MRAM), Solid State Drive (SSD), Racetrack memory, etc. These technologies (memory and storage technologies) are better at some properties than traditional technologies, but they still cannot completely replace such traditional and existing technologies. Because of all of these different technologies, all the disk and RAM technologies have to co-exist in the same architecture or system, which leads to a hybrid structure.

Programmers dynamically allocate memory in RAM, using function calls like malloc or calloc in a C++ implementation. By way of explanation, in these dynamic allocations, all dynamically allocated data are stored in a heap, e.g.,

```
char heap[heap_size];
int end_of_heap = 0;.
```

A trivial implementation of malloc in C++ is:

```
void* malloc ( int size ) {
    void* loc = (void*) &heap[end_of_heap];
    end_of_heap += size;
    return loc;
};.
```

However, such dynamic allocation call always allocates memory from the same RAM technology. This hinders an effective use of hybrid infrastructure to improve performance and reduce power usage and leakage.

Also, the new evolving disk technologies like Racetrack memory and Storage Class Memory are speculated to replace Solid State Disks. Now, in the light of so much research and advances in the disk and RAM technologies, a complete restructuring of the backend storage or RAM chips to replace the older technology disks or chips with newer technology is neither economical nor is practically feasible. Thus, the result is a hybrid structure formed in which all the different disk and RAM technologies co-exist. This poses many issues, which does not account for properly leveraging all the various available disks and RAM technologies.

SUMMARY

In a first aspect of the invention, a method comprises dynamically allocating a file or its part or to cache a file or its part between different storage technologies and respective memory technologies in a hybrid infrastructure.

In another aspect of the invention, a computer program product comprises a computer usable storage medium having readable program code embodied in the storage medium. The computer program product includes at least one component operable to: map memory technologies with multiple storage technologies to automatically decide a technology to be used to store and retrieve a file or its part or to cache the file or its part in a hybrid infrastructure; automatically link the type of the memory technologies with the particular storage technologies based on the map; and allocate the file or its part between selected ones of the memory technologies and multiple storage technologies in the hybrid infrastructure.

In an additional aspect of the invention, a computer system is provided for allocating memory in a hybrid infrastructure. The system comprises a CPU, a computer readable memory and a computer readable storage media. The system further comprises first program instructions to provide a syntax for dynamic allocation functions including malloc and calloc which specify a type of storage technologies to store parts of a file from multiple memory technologies. The system further comprises second program instructions to map the storage technologies to the multiple dynamic memory technologies. The first and second program instructions are stored on the computer readable storage media for execution by the CPU via the computer readable memory.

In a further aspect of the invention, a method of deploying a system for allocating memory and storage in a hybrid infrastructure comprises: determining types of memory technologies and storage technologies in a hybrid infrastructure; determining types of data to store in the different types of memory and storage technologies of the hybrid infrastructure; and allocating the data amongst the different types of memory and storage technologies of the hybrid infrastructure based on the determining steps.

In another aspect of the present invention, a system implemented in hardware comprises a computing system operable to allocate parts of files between at least one of memories and storage technologies in a hybrid technology system by providing a modified malloc and calloc to specify a type of storage technologies to store parts of a file based on user configuration and types of data to be stored within the hybrid technology system

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 1 shows a comparison of different storage technologies;

DETAILED DESCRIPTION

Figure 2:
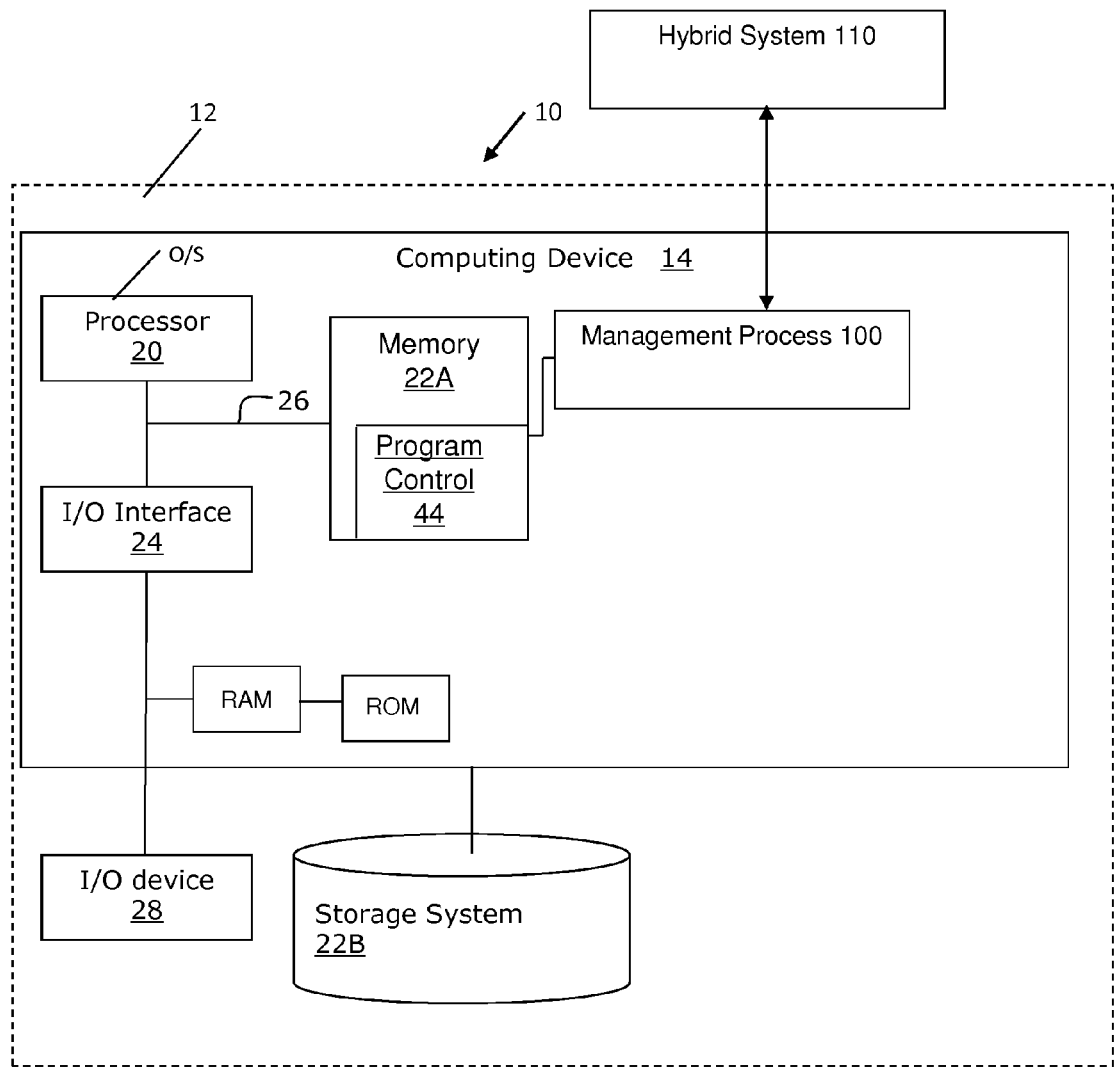
FIG. 2 is an illustrative environment for implementing the steps in accordance with aspects of the invention.

The present invention generally relates to dynamic allocation of memory in a hybrid system, and more particularly, to a method and system to leverage a hybrid infrastructure for dynamic memory allocation and persistent file storage. In embodiments, the present invention provides an intelligent mechanism to allocate dynamic memory across multiple storage technologies (e.g., RAM) and write files across multiple disk technologies configurable by the user in order to improve usage of the hybrid infrastructure. For example, if the user has to write a video file to persistent storage, it is now possible to achieve improved performance by storing the initial part of the video in SSD and the remaining in HDD. In this way, for example, performance would be improved when the video starts, and during buffering and prefetching, the data from the disk technologies would be readily available in HDD, thereby providing a blend of SSD and HDD. Thus, by implementing the present invention, it is now possible to specify the split up between the various RAM technologies residing in the system, and to write portions of a file in both SSD and HDD (or other technologies), thus improving performance.

In specific embodiments, the present invention permits the user to utilize a hybrid RAM infrastructure while allocating memory using malloc or calloc. Also, it is now possible to allow the user to utilize a hybrid disk infrastructure while storing persistent data using fwrite, etc. Moreover, by implementing the present invention, it is now possible to map the RAM technologies with appropriate technologies to automatically decide the disk technology to be used to store a file or its part or to cache a file or its part. In this way, it is now possible to enhance the dynamic memory allocation and file writing calls, e.g., fwrite, malloc and calloc, to allow the programmer to specify a range of data to be stored in a particular disk technology and to specify the type of RAM technology to be used, and automatically link the RAM technology types with the disk technologies for seamless utilization of the hybrid infrastructure. Advantageously, the present invention can be implemented in cloud computing environments in which tasks are assigned to a combination of connections, software and services accessed over a network.

FIG. 1 shows a comparison table of different technologies. As shown in FIG. 1, for example, the density of PRAM is very high and the read speed is slow; whereas the density of Static Random Access Memory (SRAM) is very low and the read speed is very fast. On the other hand, as an example, SRAM has a very high leakage and PRAM has a low leakage. Similar comparisons can also be made as shown in FIG. 1.

More specifically, SRAM is a type of semiconductor memory that does not need to be periodically refreshed. This is because SRAM uses bistable latching circuitry to store each bit. However, the read and write speed over SRAM are the fastest and thus SRAM provides the best I/O performance even though at the cost of the increased power leakage. On the other hand, embedded Dynamic Random Access Memory (eDRAM) is a capacitor-based dynamic random access memory usually integrated on the same die or in the same package as the main ASIC or processor. Since real capacitors leak charge, the information eventually fades unless the capacitor charge is refreshed periodically. However, due to the constant refresh, the power consumption as well as the power leakage is high. Although this power leakage is significantly lower than the SRAM leakage, the I/O performance is also less than that of SRAM but is better than other RAM technologies.

Phase-change memory (also known as PCM, PRAM, PCRAM, Ovonic Unified Memory, Chalcogenide RAM and C-RAM) is a type of non-volatile computer memory. PRAM uses the unique behavior of chalcogenide glass, which can be "switched" between two states, crystalline and amorphous, with the application of heat. The contact between the hot phase-change region and the adjacent dielectric is a fundamental concern. For example, the dielectric may begin to leak current at higher temperature; however, this power leakage is very low as compared to the previous technologies. But comparing the read and write speed with the other RAM technologies, PRAM has very slow I/O performance.

In MRAM, data is not stored as electric charge or current flows, but by magnetic storage elements. The elements are formed from two ferromagnetic plates, each of which can hold a magnetic field, separated by a thin insulating layer. One of the two plates is a permanent magnet set to a particular polarity; whereas, the other field will change to match that of an external field. A memory device is built from a grid of such "cells". Since MRAM is a non-volatile memory technology, there is no power supply to each MRAM cell. As such, MRAM cells do not consume any standby leakage power. Therefore, the only leakage power is the circuit leakage power for MRAM caches, which is very low as compared to the total leakage power for other cache technologies. However, even though the power leakage is low, the performance is not very comparable with DRAM or SRAM.

As to disk technologies, a solid-state drive (SSD) is a data storage device that uses solid-state memory to store persistent data. SSD is an external storage device designed on the basis of semiconductor memory. An advantage of SSD is that it does not contain any mechanical moving parts, which provides an advantage over HDD (Hard Disk Drive). For example:

The access time of the SSD is almost 250 times less than that of HDD;
The read speed of SSD is higher than that of HDD;
Since the SSD does not contain any mechanical parts, it is more resilient from damage;
Unlike the HDD, SSD makes no noise during its operation;
SDD is lighter in weight as compared to HDD; and
The power consumption of SSD is low.

As thus shown above, certain storage technologies are better for certain applications than others, but while still providing tradeoffs. For this reason, the present invention is able to properly allocate the memory (storage) in a hybrid infrastructure to ensure improved performance, taking into consideration these different performance criteria, as discussed herein.

SYSTEM ENVIRONMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 2 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 2). It should be understood that the server 12 and/or computing device 14 can include a hybrid infrastructure as described herein, or alternative or in any combination, provide the functionalities of the present invention to a hybrid infrastructure 110.

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM) (of any sort described herein), a read-only memory (ROM), and an operating system (O/S).

The computing device 14 is in communication with the external I/O device/resource 28 and the storage system 22B (which can include any combination of disk technologies as described herein). The I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a management process 100, e.g., the processes described herein. The management process 100 can be implemented as one or more program code in the program control 44 stored in memory 22A, as separate or combined modules. Additionally, the management process 100 may be implemented as separate dedicated processors or a single or several processors to provide the function of the management process 100. While executing the computer program code, the processor 20 can read and/or write data to/from memory 22A, storage system 22B, and/or I/O interface 24. The bus 26 provides a communications link between each of the components in the computing device 14.

In embodiments, the management process 100 can allocate storage technologies in a hybrid system 110 (which may be internal or external to the computing system 12 and/or computing device 14). As should be understood by those of skill in the art, the hybrid system 110 can include any combination of the technologies shown in FIG. 2 and/or as described herein. The hybrid system 110 can also be based in the cloud, for example.

In embodiments, the management process 100 provides the following features:
  enhance the dynamic allocation functions (e.g., malloc and calloc in a C++ implementation) used to allocate buffers to accept from the user the breakup of a number of bytes to be allocated in various RAM technology. This helps the user utilize the hybrid infrastructure effectively to ensure high speed as well as lower power leakage or consumption;

enhance the file writing functions, e.g., fwrite and other file writing functions, to accept from the user the split of the data to be stored in various disk technologies. This helps the user achieve improved performance effectively using the hybrid disk portfolio; and map all the buffers in various RAM technologies (which is used interchangeably with dynamic memory technologies) to the disk technologies when written back for persistent storage, ensuring that the data in the RAM technologies having high performance is written back to a disk having a high performance and likewise for the other type of data. That is, technologies can be mapped to specific types of performances, across RAM and disk technologies, e.g., low to low, medium to medium, high to high, etc. And further, when the data is cached backed in RAM for reading, the same mapping is maintained.

In embodiments, for example, to provide the above features, a new syntax for dynamic allocation functions like malloc is provided, which includes the size of bytes to be allocated and the type of technology to be used, as well as a variable number of parameters which will be of the same type as the first two parameters indicating the size and the type of RAM technology to be used for that sized buffer. In embodiments, this returns an array of pointers, each element of the array pointing to the start of the chunk allocated for the respective RAM type, as described herein. More specifically, the syntax can include, for example, void**malloc (size_t size, size_t RAM_type, ... ).

In embodiments, malloc implementation can allocate space in different types of RAM technologies. More specifically, in embodiments, the malloc allocates "size" bytes of memory in the different technologies in the hybrid system 110. As should be understood by those of skill in the art, when the allocation succeeds, a pointer to the block of memory is returned, in order to be able to retrieve such saved data. For example, the present invention can execute the follow command:

---
int pointer_array = (int)malloc(sizeof(int)*20, 1, sizeof(int)*50,2, sizeof(int)* 100,3).
---

Figure 3:
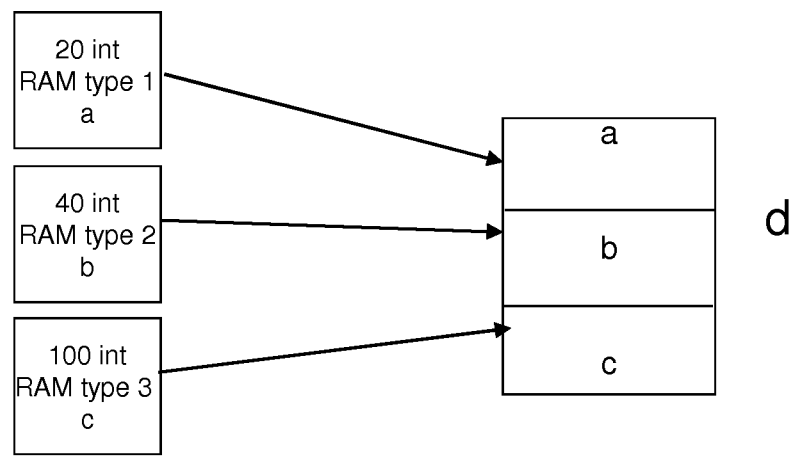
FIG. 3 shows an array with pointers in accordance with aspects of the present invention.

In this example, the malloc implementation will allocate space for 20 integers in RAM technology type 1 starting at address, e.g., "a", 50 integers in RAM technology type 2 starting at address, e.g., "b" and 100 integers in RAM technology type 3 starting at address, e.g., "c". In this way, the returned value is the pointer to the array containing elements {a,b,c} shown in representative FIG. 3. In accordance with the present invention, the malloc will return the value "d" in the above example. By implementing this schema, it is now possible to allocate data bytes to specific technologies within a hybrid system, to ensure that the appropriate technologies are being used for the appropriate data and user requirements.

Of course, it should be understood that the size of the integer can vary, and that the above example is merely provided as an illustration of the present invention. Also, the RAM types 1, 2, 3 can also vary depending on the data types and the user requirements. For example, implementing the above, the user can specify a range of data to be stored in a particular disk technology and to specify the type of dynamic memory technologies to be used, and the system and method of the present invention can automatically link (e.g., map) a type of the dynamic memory technologies with the disk technologies for seamless utilization of the hybrid infrastructure.

Similarly, calloc is also modified by the present invention to include the support for multiple RAM technology support. More specifically, in embodiments, the calloc allocates a region of memory large enough to hold "nelements" of "size" bytes each. The allocated region is initialized to zero. For example, void **calloc(size_t nitems, size_t size, size_t RAM_type, ... ).

In this way, the calloc will return an array of pointers pointing to the starting addresses of the memories allocated in the different types of RAM technologies, where the three parameters would repeat for every RAM technology to be used.

In further embodiments, the file writing calls, e.g., fwrite, can also be modified to allow the user to specify the type of disk technology to be used to persistently store the parts of a file as follows:

---
size_t fwrite(const void *ptr, FILE *stream, size_t size, size_t nmemb, size_t Disk_type, ...).
---

In this way, the new file writing function takes the array to be written pointed to by "ptr" to the given stream. Also, the new file writing function writes "nmemb" number of elements of size on the disk technology type specified by Disk_type. In embodiments, the last three parameters are repeated for every disk technology to be used so that for every triplet, size*nmemb amount of data is written on the disk technology Disk_type. As should be understood by those of skill in the art, the returned value is the total amount of data written across all the disk technologies. i.e., sum of all the size*nmemb from every triplet for each disk technology.

The present invention also creates policies (maps) so that when a buffer is written back to disk for persistent storage, there is no need for the user to specify the breakup of the data to be stored in the disk technologies. Instead, based on the policies defined and the RAM technology in which the buffer is allocated, the appropriate disk technology is automatically selected. For example, the performance of RAM technologies decreases in the order of sRAM, eDRAM, MRAM, PRAM and similarly, in case of disk technologies, it reduces in the order of SSD, SAS, SATA (Serial Advanced Technology Attachment). As should be understood by those of skill in the art, SATA is a computer bus interface for connecting host bus adapters to mass storage devices such as hard disk drives and optical drives. Thus, the high performing sRAM and eDRAM can be mapped to high performing SSD. Also, an average performing MRAM can be mapped to SAS disks and the low performing PRAM to the SATA disks. This ensures that the data is properly stored based on the data characteristics. Similarly, when caching the data from disks, appropriate RAM technology, as mapped, is used in a similar manner.

By way of example, Table 1, below, shows an appropriate mapping scheme.

TABLE 1

| RAM TECHNOLOGY | DISK TECHNOLOGY |
|---|---|
| SRAM AND EDRAM | SSD |
| MRAM | SAS HDD |
| PRAM | SATA HDD |

By using the mapping, it is now possible to map the RAM technologies with appropriate technologies to automatically decide the disk technology to be used to store a file or its part or to cache a file or its part.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

FLOW DIAGRAM

Figure 4:
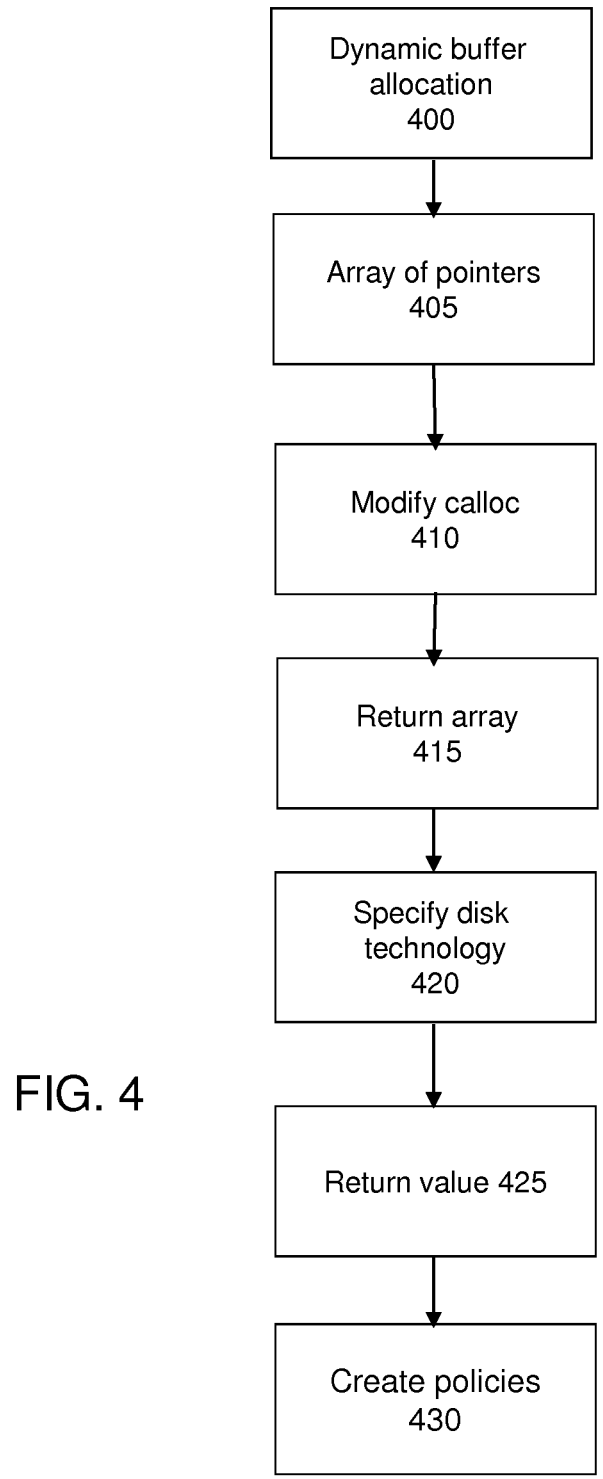
FIG. 4 shows an exemplary flow in accordance with aspects of the invention.

FIG. 4 shows an exemplary flow for performing aspects of the present invention. The steps of FIG. 4 may be implemented in the environment of FIG. 2, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 4 depicts an exemplary flow for a process in accordance with aspects of the present invention. At step 400, the processes of the present invention provide a dynamic buffer memory allocation. For example, the processes of the present invention provide a new syntax for dynamic allocation functions like malloc and calloc. As discussed above, the malloc can include the size of bytes to be allocated and the type of technology to be used, as well as parameters indicating the size and the type of RAM technology to be used for that sized buffer. In turn, at step 405, an array of pointers is returned, where each element of the array points to the start of the chunk allocated for the respective RAM type. At step 410, the processes of the present invention provide a modified calloc to multiple RAM technology support. In turn, at step 415, the calloc will return an array of pointers pointing to the starting addresses of the memories allocated in the different types of RAM technologies and the parameters would repeat for every RAM technology to be used.

At step 420, the user can specify the type of disk technology (also referred to herein as storage technology) to be used to persistently store the parts of a file. This can be accomplished using, for example, file writing calls like fwrite. In this way, the new file writing function would take the array to be written pointed to by a pointer to the given stream, and writes a number of elements of size on the disk technology type specified by, e.g., Disk_type. As already described herein, the parameters are repeated for every disk technology to be used so that for every triplet, size*nmemb amount of data is written on the disk technology Disk_type. At step 425, a value is returned, which is the total amount of data written across all the disk technologies. i.e., sum of all the size*nmemb from every triplet for each disk technology. At step 430, policies are created so that when a buffer is written back to disk for persistent storage, there is no need for the user to specify the breakup of the data to be stored in disk technologies. In this way, based on the policies, the appropriate disk technology is automatically selected in the hybrid infrastructure.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
dynamically allocating a file, by a computing device, between different storage technologies and respective memory technologies in a hybrid infrastructure, the dynamically allocating comprising:
using a malloc syntax, which includes a first set of variables for a first size of bytes and a first type of storage or memory technology, to allocate a first buffer;
using the malloc syntax, which further includes a second set of variables for a second size of bytes and a second type of storage or memory technology, to allocate a second buffer;
returning pointers, which point to a starting address of the first buffer in the first type of storage or memory technology and a starting address of the second buffer in the second type of storage or memory technology:
mapping the respective memory technologies to the different storage technologies according to performance; and
storing an initial portion of the file in the first buffer on the first type of storage or memory technology and automatically storing a remaining portion of the file in the second buffer on the second type of storage or memory technology based on the mapping.

2. The method of claim 1, wherein the respective memory technologies comprise at least one of: random access memory (RAM), parameter random access memory (PRAM), static random access memory (SRAM) embedded dynamic RAM (eDRAM), phase-change memory and magnetoresistive random-access memory (MRAM).

3. The method of claim 2, wherein the different storage technologies comprise at least one of solid-state drive (SSD) and a hard disk drive (HDD).

4. The method of claim 1, wherein the allocating is configurable by a user.

5. The method of claim 1, wherein the mapping the respective memory technologies to the different storage technologies automatically decides a technology to be used to store the file from the respective memory technologies to the different storage technologies.

6. The method of claim 1, further comprising specifying a range of data to be stored in a particular storage technology of the different storage technologies and to specify a type of the respective memory technologies to be used, and automatically link the type of the respective memory technologies with the particular storage technologies for seamless utilization of the hybrid infrastructure.

7. The method of claim 1, wherein the allocating comprises allocating the first and second buffers to accept from a user a breakup of a number of bytes to be allocated in various memory technologies including the first and second types of memory technologies.

8. The method of claim 1, wherein the mapping further comprises mapping the respective memory technologies to respective storage technologies of the different storage technologies, when written back for persistent storage.

9. The method of claim 8, wherein the mapping maps a same specific type of performance between the respective memory technologies and the different storage technologies.

10. The method of claim 9, further comprising maintaining the mapping when data is cached backed in the respective memory technologies for reading.

11. The method of claim 1, wherein the first set of variables and the second set of variables of the malloc syntax indicate the first or second size of bytes and the first or second type of memory technology are to be used for the first or second sized buffer.

12. The method of claim 1, wherein the malloc syntax allocates space in the first and second type of storage or memory technologies.

13. The method of claim 1, further comprising providing a modified calloc to include support for the respective memory technologies, wherein the modified calloc comprises:
variables specifying a type of storage or memory technology and a size of bytes;
allocating a first region of the first type of storage or memory technology to hold a number of elements of the first size of bytes;
allocating a second region of the second type of storage or memory technology to hold a number of elements of the second size of bytes;
initializing the first region and the second region to zero; and
returning pointers pointing to the allocated starting addresses of the first region and the second region.

14. A computer program product comprising a computer readable storage memory or device having readable program code embodied in the storage memory or device, wherein the computer readable storage memory or device is not a transitory signal per se, the computer program product includes at least one component operable to:
dynamically allocate a file between different storage technologies and memory technologies in a hybrid infrastructure, the dynamically allocating comprising:
enhancing a syntax to include variables for a first size of bytes and a first type of storage or memory technology, to allocate a first buffer;
enhancing the syntax to include variables for a second size of bytes and a second type of storage or memory technology, to allocate a second buffer; and
returning pointers, which point to a starting address of the first buffer in the first type of storage or memory technology and a starting address of the second buffer in the second type of storage or memory technology;
map the memory technologies with multiple storage technologies according to performance to automatically determine which technology to be used to store and retrieve the file;
link each type of the memory technologies with a particular storage technology of the different storage technologies; and
store the file between selected ones of the memory technologies and the multiple storage technologies in the hybrid infrastructure, the storing comprising storing an initial portion of the file in the first buffer on the first type of storage or memory technology and automatically storing a remaining portion of the file in the second buffer on the second type of storage or memory technology based on the mapping,
wherein when the file is written to persistent storage, the file is automatically allocated to the particular storage technology for each type of the memory technologies based on the mapping.

15. The computer program product of claim 14, wherein:
the memory technologies comprises at least one of: random access memory (RAM), parameter random access memory (PRAM), static random access memory (SRAM) embedded dynamic RAM (eDRAM), Phase-change memory and Magnetoresistive random-access memory (MRAM); and the multiple storage technologies comprise at least one of solid-state drive (SSD) and a hard disk drive (HDD).

16. The computer program product of claim 14, wherein the mapping maps a same specific type of performance between the memory technologies and the particular storage technologies.

17. The computer program product of claim 14, further comprising maintaining the mapping when data is cached backed in the memory technologies for reading.

18. The computer program product of claim 14, wherein the enhanced syntax is a modified malloc syntax, which comprises a size of bytes to be allocated, a type of storage technology to be used, and indicates a size and the type of memory technologies to be used for a particular sized buffer.

19. The computer program product of claim 18, wherein the enhanced syntax is a modified malloc syntax, which allocates space in different types of technologies.

20. The computer program product of claim 14, wherein the enhanced syntax is a modified calloc syntax, which includes support for the memory technologies, wherein the calloc returns pointers pointing to a starting addresses of the memory technologies allocated in each type of the memory technologies.

21. A computer system for allocating memory in a hybrid infrastructure, the system comprising:
    a CPU, a computer readable memory and a computer readable storage media;
    program instructions to enhance a syntax for dynamic allocation functions including malloc and calloc, which specify a type of storage technologies to store parts of a file from multiple memory technologies, the enhanced malloc comprises:
        a first set of variables defining a first size of bytes to be allocated to a first buffer and a first type of memory technology to be used for the first buffer; and
        a second set of variables defining a second size of bytes to be allocated to a second buffer and a second type of memory technology to be used for the second buffer;
    program instructions to allocate the first buffer according to the first set of variables and the second buffer according to the second set of variable;
    program instructions to map the type of storage technologies to different types of the multiple memory technologies according to performance, the mapping comprising the first type of memory technology and the second type of memory technology; and
    program instructions to store an initial portion of the parts of the file in the first buffer on the first type of memory technology and to automatically store a remaining portion of the parts of the file in the second buffer on the second type of memory technology based on the mapping,
    wherein the program instructions are stored on the computer readable storage media for execution by the CPU via the computer readable memory.

22. The computer system of claim 21, further comprising program instructions to link the type of storage technologies to the multiple memory technologies that were mapped together.

23. A method of deploying a system for dynamically allocating, by a computing device, a file between different memory technologies and storage technologies in a hybrid infrastructure comprising:
    determining types of the memory technologies and the storage technologies in the hybrid infrastructure;
    determining types of data to store in the different types of the memory technologies and the storage technologies of the hybrid infrastructure;
    allocating the data amongst the different types of the memory technologies and the storage technologies of the hybrid infrastructure based on the determining steps, the allocating comprising:
        using a malloc syntax, which includes a first set of variables for a first size of bytes and a first type of memory or storage technology, to allocate a first buffer according to the first set of variables; and
        using the malloc syntax, which includes a second set of variables for a second size of bytes and a second type of memory or storage technology, to allocate a second buffer according to the second set of variables,
        wherein the first buffer is allocated according to the first set of variables and the second buffer is allocated according to the second set of variables;
    mapping the different types of the memory technologies and the storage technologies of the hybrid infrastructure according to performance;
    storing an initial portion of the file in the first buffer on a first type of the memory technologies and automatically storing a remaining portion of the file in the second buffer on a second type of the storage technologies based on the allocating and the mapping; and
    caching the data for reading, wherein the caching maintains the mapping.

24. A system implemented in hardware, comprising:
    a computing system, including a processor, operable to:
        allocate parts of files between at least one of memories and storage technologies in a hybrid technology system by providing a modified malloc and calloc to specify a type of memories and storage technologies to store parts of a file based on user configuration and types of data to be stored within the hybrid technology system,
        wherein the modified malloc comprises:
            a first set of variables defining a first size of bytes to be allocated to a first buffer and a first type of memory or storage technology to be used for the first buffer;
            a second set of variables defining a second size of bytes to be allocated to a second buffer and a second type of memory or storage technology to be used for the second buffer; and
            pointers, which point to a starting address of the first buffer in the first type of memory or storage technology and a starting address of the second buffer in the second type of memory or storage technology;
        modify a file writing call to accept a split from a user, such that the split specifies a size of the parts of the file to be stored in respective memories and storage technologies;
        map the respective memories and storage technologies according to performance; and
        store the parts of the file in the first buffer on the first type of memory or storage technology and automatically store remaining parts of the file in the second buffer on the second type of memory or storage technology based on the allocating, the split, and the mapping, wherein the first buffer is allocated in the first type of memory or storage technology according to the first set of variables and the second buffer is allocated in the second type of memory or storage technology according to the second set of variables; and
maintaining the mapping when the parts of the file are cached backed in the respective memories and storage technologies for reading.

\* \* \* \* \*